United States Patent [19]
Lyon

[11] Patent Number: 5,261,071
[45] Date of Patent: Nov. 9, 1993

[54] DUAL PIPE CACHE MEMORY WITH OUT-OF-ORDER ISSUE CAPABILITY

[75] Inventor: Terry L. Lyon, Roseville, Minn.

[73] Assignee: Control Data System, Inc., Arden Hills, Minn.

[21] Appl. No.: 673,030

[22] Filed: Mar. 21, 1991

[51] Int. Cl.⁵ .................... G06F 13/12; G06F 12/08
[52] U.S. Cl. .................. 395/425; 364/243.41; 364/243.42
[58] Field of Search ................ 395/375, 425

[56] References Cited

U.S. PATENT DOCUMENTS 4,991,090  2/1991  Emma et al. ............... 395/575
5,155,843  10/1992  Stamm et al. .............. 364/DIG. 1

Primary Examiner—David L. Robertson
Attorney, Agent, or Firm—Kinney & Lange

[57] ABSTRACT

A data cache memory apparatus permits load and store instructions to be issued out-of-order. The apparatus includes a memory. An instruction issue apparatus issues an instruction stream containing store and load instructions. The store instructions are completed in two passes, namely a store allocate pass and a corresponding store commit pass. A cache control is connected to the instruction issue apparatus and the memory and issues store and load addresses to the memory in response to instructions from the instruction issue apparatus. A store history table is connected to the cache control and stores a record of the addresses of the memory where data are to be stored, and thus a record of the store allocate passes issued by the instruction issue apparatus for which no corresponding store commit pass has been completed. The cache control responds to the subsequent corresponding store commit pass to issue the store address to the memory and to clear the store instruction from the store history table. If a load instruction designates an address for which a store allocate pass has issued but the corresponding store commit pass has not yet been issued, the cache control determines a conflict and the load instruction is reissued. Provision is made for retrieving data from a secondary cache and for clearing store instructions from the store history table upon detection of a branch error.

26 Claims, 3 Drawing Sheets

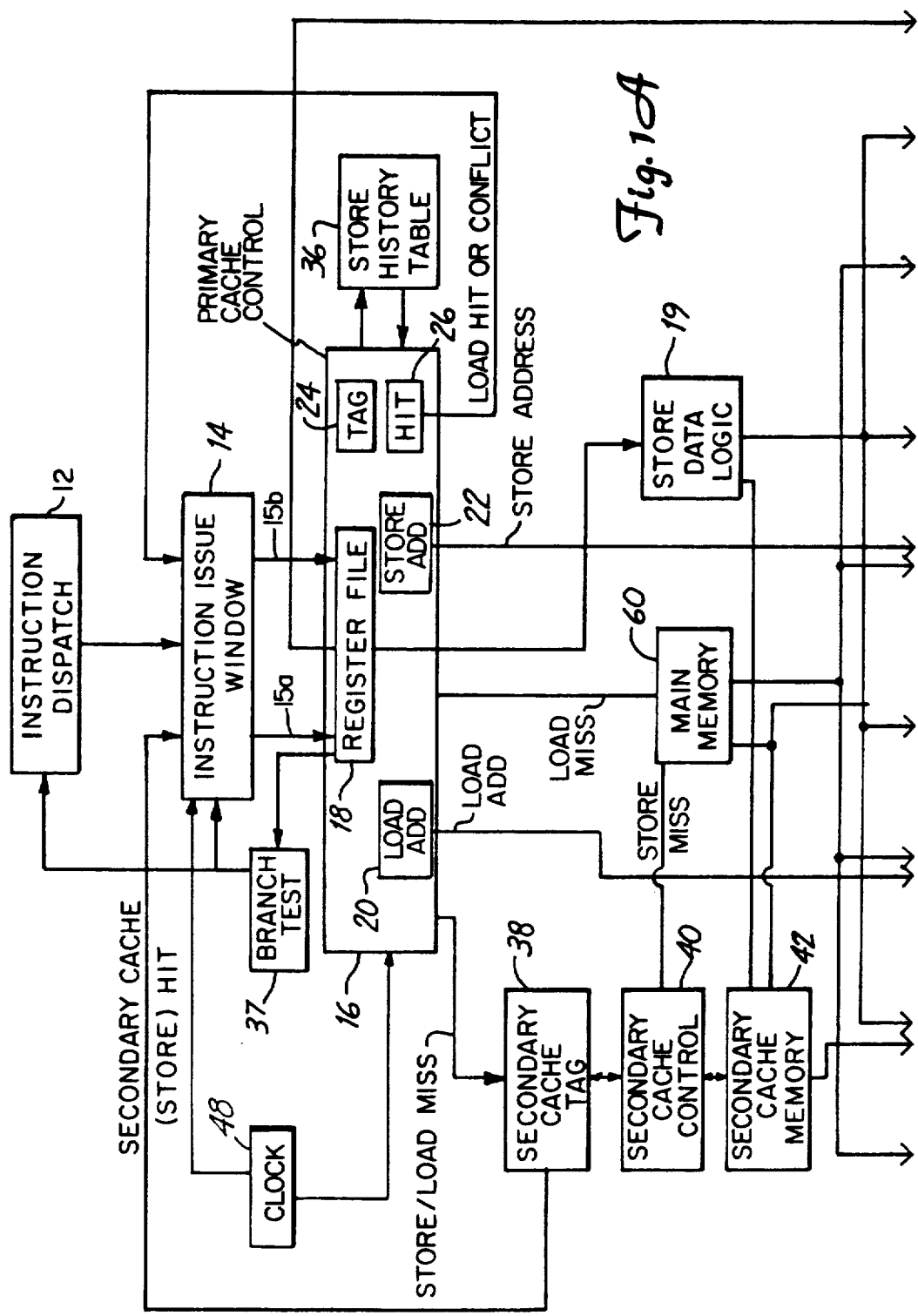

DUAL PIPE CACHE MEMORY WITH OUT-OF-ORDER ISSUE CAPABILITY

BACKGROUND OF THE INVENTION

This invention relates to computer cache memories, and particularly to cache memories capable of executing multiple memory instructions simultaneously. One feature of the invention permits load and store coherence with out-of-order issuance capabilities.

In computer organizations, it is desirable to achieve instruction issue rates of at least one, and preferably more than one, instruction per clock cycle. One technique to accomplish this is to issue multiple instructions during each clock cycle. For example, a multiple instruction issue unit might issue instructions in the order as they are found in the memory. A more general approach has been to issue instructions from a pool of instructions, thereby permitting issuance of instructions within a defined instructional window, provided certain instruction conditions are met (register conflicts, bus conflicts, arithmetic unit conflicts, etc.). It is desirable in such instances to rename registers before entering the instruction window, thereby removing all destination register conflicts.

As used herein, the term "load" shall refer to loading or reading data from a memory, and the term "store" shall refer to storing data or writing data into a memory. Thus, a "load address" is the address of the memory location from which data is loaded or read, and a "store address" is the address of the memory location where data is stored or written.

Pipeline architecture contemplates permitting a single processor to commence execution of an instruction before execution of a previous instruction has been completed. An instruction may be partially or fully executed out of normal sequence as long as the instruction does not require the results of an unexecuted instruction. In the case of a load instruction, for example, previous store instructions had to be fully executed before the load instruction could be executed.

One problem with prior multiple instruction issue organizations is that load and store operations could not be done completely out of order. If a load instruction issued before a preceding store instruction in a prior instruction organization, the load instruction would receive improper data because the store should have been completed first. To avoid conflict conditions, prior instruction issue techniques have required stores be completed before issuing following loads.

A typical instruction mix will include approximately 25% load instructions and 10% store instructions. A single pipeline cache is not adequate for instruction issue rates greater than two instructions per clock. Consequently, it is desirable to employ a dual data cache pipeline structure.

SUMMARY OF THE INVENTION

The present invention relates to a data cache in which load and store instructions may be issued out-of-order and in which simultaneous load and store instructions can be executed. A cache memory apparatus is provided for storing and loading data. The apparatus includes a memory. An instruction issue apparatus issues an instruction stream containing store and load instructions. The store instructions are completed in two passes, namely a store allocate pass and a corresponding store commit pass. A cache control is connected to the instruction issue apparatus and the memory and issues load addresses to the memory in response to instructions from the instruction issue apparatus. The cache control is responsive to a store instruction from the instruction issue apparatus to store a record in a store history table, the stored record being of the store instruction and its corresponding address of the memory where data are to be stored. Thus, the records stored in the store history table are records of the store allocate passes issued by the instruction issue apparatus for which the corresponding store commit passes have not been completed. The cache control is also responsive to the subsequent corresponding store commit pass to issue the store address to the memory and to clear the store instruction from the store history table.

The invention provides a novel technique of issuing addresses to a cache memory where data are to be stored and from where data are to be loaded. The technique includes issuing an instruction stream containing load and store instructions, with the store address being stored in a store history table during the store allocate pass of the store instruction and the store address being issued during the corresponding store commit instruction. A conflict is established if a load instruction designates an address for which no store address has yet issued (meaning the store address has been allocated, but not yet issued by the store history table). The load instruction is reissued in response to this conflict.

One feature of the present invention is that load and store instructions do not need to be issued in the order that they appear in the instruction sequence in memory, but instead may be issued out-of-order with operations continued without concern that incorrect data will be loaded or stored. In particular, incomplete store operations are detected so that subsequent load operations dependent on the stores can be identified and reissued at a later time.

Another feature of the present invention resides in the provision of a two-pass store operation, permitting the cache to reserve for the store of data without actually storing the data, and permitting later storing of data into the cache.

It is desirable to achieve peak instruction issue rates greater than two instructions per clock cycle. However, single pipeline data caches are not capable of accomplishing such an instruction issue rate. Accordingly, another feature of the present invention concerns a multiple data cache pipeline structure to increase instruction issue rates.

In accordance with another feature of the present invention the multiple data cache pipeline has at least one pipeline dedicated to load instructions and at least one pipeline dedicated to store instructions.

Yet another feature of the present invention resides in the optional provision of a secondary cache structure for store and load misses in the primary cache.

Another feature of the invention resides the provision of a technique for reducing the two-instructions-per-clock bandwidth of the primary cache to a single-instruction-per-clock bandwidth of the secondary cache.

BRIEF DESCRIPTIONS OF THE DRAWINGS

FIGS. 1A and 1B, taken together, is block diagram of a cache memory organization in accordance with the presently preferred embodiment of the present invention; and FIG. 2 is a functional diagram illustrating the operation of the cache memory illustrated in FIG. 1.

DETAILED DESCRIPTION OF THE PREFERRED EMBODIMENTS

Figure 1B:
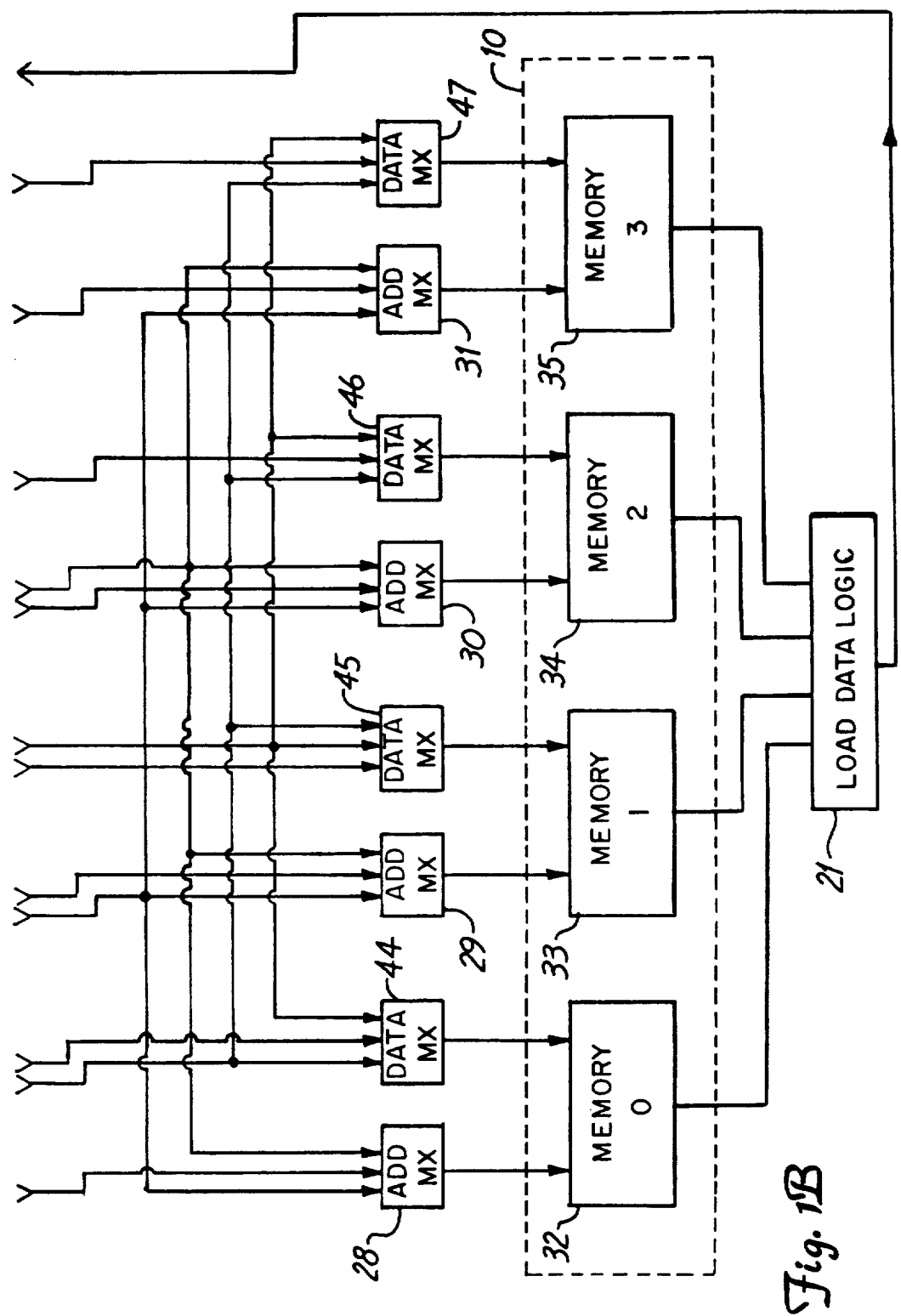

Referring to the drawings, and particularly Figure there is illustrated a cache memory organization in accordance with the presently preferred embodiment of the present invention. The apparatus includes a primary cache memory 10 into which data is stored through store data logic 19, and out of which data is loaded through load data logic 21 to the register file 18 of the computer. The apparatus includes an instruction dispatch 12 which maintains instruction issue window 14 filled with instructions. Load and store instructions are issued to primary cache control 16 (which includes the computer register file 18 for load and store address operands) over dual pipelines 15a and 15b; pipeline 15a carrying load instructions from window 14 to primary cache control 16 and pipeline 15b carrying store instruction from window 14 to primary cache control 16. The cache control also includes load address adder and store address adder 22 to generate load and store addresses for memory 10. Primary tag 24 is a memory which maintains a record of the tags or addresses associated with locations in memory 10 where data is stored.

Hit control 26 indicates when a load miss or pending store conflict occurs. Particularly, if a load request is for data which is not in the cache memory (nor for which there is a pending store instruction), hit control 26 initiates a request to the secondary cache to retrieve the data therefrom, as will be explained below. (If the data is not in the secondary cache, that cache issues a request to the main memory to retrieve the data therefrom, as will be explained below.) If the load request is for data for which there is a pending store to be completed, hit control causes the load instruction to be reissued by instruction issue window 14, as will be explained below. Load and store addresses are provided through each of the multiplexers 28 to 31 to the several memory units 32 through 35, respectively. In the preferred embodiment of the present invention cache memory 10 comprises four memory units 32-35, but it is understood this is for purposes of illustration, and it would be within the scope of the present invention to use any convenient number of memory units. The individual memory units 32-35 are accessed through a corresponding number of address multiplexers 28-31 and data multiplexers 44-47.

Store history table 36 is connected to primary cache control 16; the store history table 36 containing a table of entries identifying all pending store instructions which have been issued by instruction issue window 14, but not yet completed (i.e., store instructions for which an address has been allocated—the store allocate pass, but not yet issued to the cache memory—the store commit pass). As will be apparent hereinafter, the store history table 36 contains information concerning the store instructions, and the address in the primary cache for which each store instruction relates. For sake of simplicity in explanation, the store history table 36 will be described as holding information for up to sixteen store instructions, but it is understood that the actual number of store instructions identified in store history table 36 may be any convenient number.

A load miss can occur from either a memory access conflict with a store instruction, or by virtue of the data not being present in primary cache 10. If the miss condition occurs by virtue of a conflict with a store, hit indicator 26 issues a signal to instruction issue window 14 to reissue the instruction. If the load miss condition occurs due to the data not being present in memory 10, hit indicator 26 issues a load miss to instruction window 14 and a load instruction to secondary cache tag 38, which in turn operates secondary cache control 40 to retrieve the data from secondary cache memory 42. Secondary cache memory 42 sends the data through a selected multiplexer 44-47 to the selected memory unit 32-35 of primary cache 10. The data is thus available for load and retrieval from the primary cache for loading the register file 18. Tag memory 24 is updated through the secondary cache hit signal from secondary cache control 40 to indicate that the data is in cache memory 10.

If the data is not found in secondary cache memory 42, a request is made to main memory 60 to load the data into both the primary data memory 10 and secondary cache memory 42 at the address of the instruction which initiated the miss. Tag memory 24 is updated to indicate that the data is in cache memory 10.

In either case (whether the data is retrieved from the secondary cache or the main memory), the load miss signal from primary cache control 16 to instruction issue window 14 will cause the load instruction to be reissued, causing retrieval from memory 10. When the data is transferred from secondary cache memory 42 or from central memory, the reissued load instruction will "hit" in the primary data cache and be loaded to the register file.

Clock 48 is connected to window 14 and primary cache control 16 as shown as well as to secondary cache control 40, dispatch 12, primary cache memory 10, secondary cache memory 42 and main memory 60 and other parts of the system as is well known. Clock 48 provides successive clock cycles.

I. Issuing Out-of-Order Load and Store Instructions.

Load and store instructions are sent from instruction dispatch 12 and issued from instruction issue window 14 to cache control 16. Store instructions are issued from the window in two passes (two clock cycles). The first pass of the store instruction abides by the rules of the algorithm described below. The purpose of the first pass (called the "store allocate" pass) is to enter information into store history table 36 to reserve the address to which the store will write, as well as the bytes which will be changed. The second pass of the store (called the "store commit" pass) is done after completion of all previous instructions without errors or exceptions and after all branch condition tests have been resolved. Load and store instructions are issued to the cache memory in accordance with the following algorithm:

1. Load instructions may be issued in any order in the instruction stream as long as there are no store instructions ahead of the load instructions that had been allocated but not issued; and
2. Store instructions may be issued in any order (although issuing stores in the order of their occurrence in the instruction stream allows faster freeing of loads to issue, and allows invalidation of "unbranch" stores to be performed without difficulty as explained below).

As an example, and with reference to the following Table I which illustrates a sequence of load and store instructions, load instruction 7 cannot be issued until store instruction 5 has been committed. It would be permissible to issue either load instruction or load instruction 3 or any of store instructions 5, 9 and 13 during the first issue cycle. If store instruction 5 is issued during the first cycle, then it would be permissible to issue instructions 1, 3, 7, 9 or 13 on the next clock cycle.

TABLE I

| INSTRUCTION STREAM | |
|---|---|
| NUMBER | INSTRUCTION |
| 1 | Load from Address A |
| 2 | Add |
| 3 | Load from Address B |
| 4 | Add |
| 5 | Store to Address D |
| 6 | Add |
| 7 | Load from Address D |
| 8 | Add |
| 9 | Store to Address E |
| 10 | Add |
| 11 | Load from Address D |
| 12 | Add |
| 13 | Store to Address E |

In accordance with the above algorithm, a load instruction is issued only after (i) all store instructions in the instruction stream which precede the load instruction have either been issued from the window a first time (store allocate) so an entry in history table 36 reserves the memory location of the store, or (ii) the store instructions have been issued twice (store commit) so data is stored in the cache at the appropriate location. A load instruction causes (i) examination of the tag to determine if the requested data is in the primary cache memory, and (ii) the store history table 36 be accessed and the load address and bytes be compared associatively with the entries of pending stores in the history table. A match in the store history table means that the load instruction is seeking data not yet entered into the memory, and a conflict exists requiring the load instruction be reissued at a later time. Hence, a match of the load instruction and the address in store history table 36 forces a conflict condition, thereby operating hit indicator 26 to send a signal to instruction issue window 14 causing the pipeline to reissue the load instruction at a later time. If no conflict is found (meaning the data sought is correctly in the primary cache 10) and if primary tag memory 24 indicates the data is present, the load instruction is issued to the cache thereby transferring the data to the register file. If a conflict exists, the load instruction which caused the conflict is repeatedly reissued to cache control 16 via the instruction issue window 14 until one of the following conditions occurs: (i) the conflict is resolved by the second pass of the appropriate store instruction (store commit), or (ii) a completion of a previous instruction (which would indicate a wrong branch direction or an error exit, as hereinafter explained), or (iii) the missing data is retrieved from secondary cache 42 or the main memory and entered into the primary cache 10, as heretofore explained.

The address entered into the history table 36 on the first issue (store allocate) of the store instruction is also used to reserve the address location (lines) in the cache memory 10 until the store is completed. This prevents a later instruction from casting out a line of data or loading a new line over data that is known to be needed in the immediate future. Also, it allows the instruction issue window to issue a second pass (store commit) and remove that store instruction immediately from the issue window. When the store is completed (store commit), the history table entry for that store is invalidated to permit previously conflicting load instructions to be processed.

II. Clearing Invalid Store Allocates from the Store History Table.

One feature of the present invention concerns conditionally issuing instructions. In most computer instruction sets it is common to have branch instructions which read register values to determine whether or not a branch is to be taken. Typical memory organizations require branch testing to occur before issuing a following store to be certain a wrong branch is not taken and erroneous data stored into the cache. Conditional issuing of loads is not a problem in the present invention because destination registers are renamed so that "older" register values are not lost. With the present invention, it is not necessary to resolve the branch condition or perform the branch test before issuing loads and store allocates. Store commits are processed after all preceding instructions have been completed so any errors in issuing load or store allocate instructions on the wrong branch path are resolved before errors can be committed. Consequently, instructions may issue prior to the branch test being completed, but any store commit would be prevented if the instructions are found in the wrong path. Thus, the instructions are issued conditionally. The first pass store issue (store allocate) will enter the store into the history table 36. Branch test 37 tests whether the branch is correct or in error before the second pass store issue (store commit). If the branch test is found correct, the stores are committed to memory after the completion of all previous instructions, and dependant loads are executed. If the branch direction was wrong, the store commit will not be issued and the cache data will not be damaged. Thus, the branch conditions are resolved.

Two techniques are employed for clearing the invalid store allocates from the store history table. The first technique is accomplished during the second pass store (store commit) in which the current entry is processed and removed from the table. All entries in the table below (older than) the current store allocate entry are presumed to be invalid and are also removed. A blank (invalid) entry is maintained in store history table 36 to identify the location of the earliest (oldest) entry.

The second technique employs the rollover of a store identification number. Each instruction is assigned a unique identification number within the range of 0 to N (N being large enough that no two active instructions will have the same identification number). Logic circuits in the store history table remove invalid store allocate entries caused by incorrect branch prediction. To accomplish this function, the store history table marks each series of entries for a pass of 0 to N identification numbers. The instruction window "rolling" over from N to 0 provides an indication to the store history table that the previous cycle of instructions has been completed, causing the logic in the store history table to clear out all entries which numbers.

III. Multiple Pipeline Data Cache

Most data caches are organized into two or more separate columns, each column being organized into one or more separate banks. For the purposes of the present invention, it is preferred to organize the columns and banks with the individual memory units 32 through 35 in accordance with the following Table II:

TABLE II

| TWO COLUMN, TWO BANK CACHE | |
|---|---|
| Address A | Memory 32 |
| Read/Write Controls A | Column 0, Bank 0 |
| Address B | Memory 33 |
| Read/Write Controls B | Column 0, Bank 1 |
| Address C | Memory 34 |
| Read/Write Controls C | Column 1, Bank 0 |
| Address D | Memory 35 |
| Read/Write Controls D | Column 1, Bank 1 |

Each memory unit 32 through 35 has, in effect, a separate address and read/write control provided by cache control 16. In theory, the cache could have four operations occurring simultaneously, assuming data is desired from four different banks and columns. In reality, however, it is probable that the cache need only support two operations occurring simultaneously with this configuration.

If the dual pipeline and two column, two bank configuration data cache were fully utilized, one might expect a 25% conflict rate between the load and store operations. However, with a two pass store operation, only the second pass (store commit) requires access to the data memories, so the conflict rate is reduced to 12.5%. However, even that conflict rate assumes a fully loaded pipeline, which rarely occurs. Consequently, the probability of conflict is significantly below 12.5%.

When accessing the cache for store operations, certain information is required before entering the data cache, namely cache hit, column and bank identification. For loads, no previous information is required if done in parallel with a store, but some information may be required in performing two or more loads in parallel. Hit, column and bank information can be determined from the cache tag in the cache control before entering the data cache. Thus, employing the double issue store technique in accordance with the present invention, the hit, column and bank information may be saved from the first pass (store allocate) for use immediately in the second pass (store commit) cycle.

Figure 2:
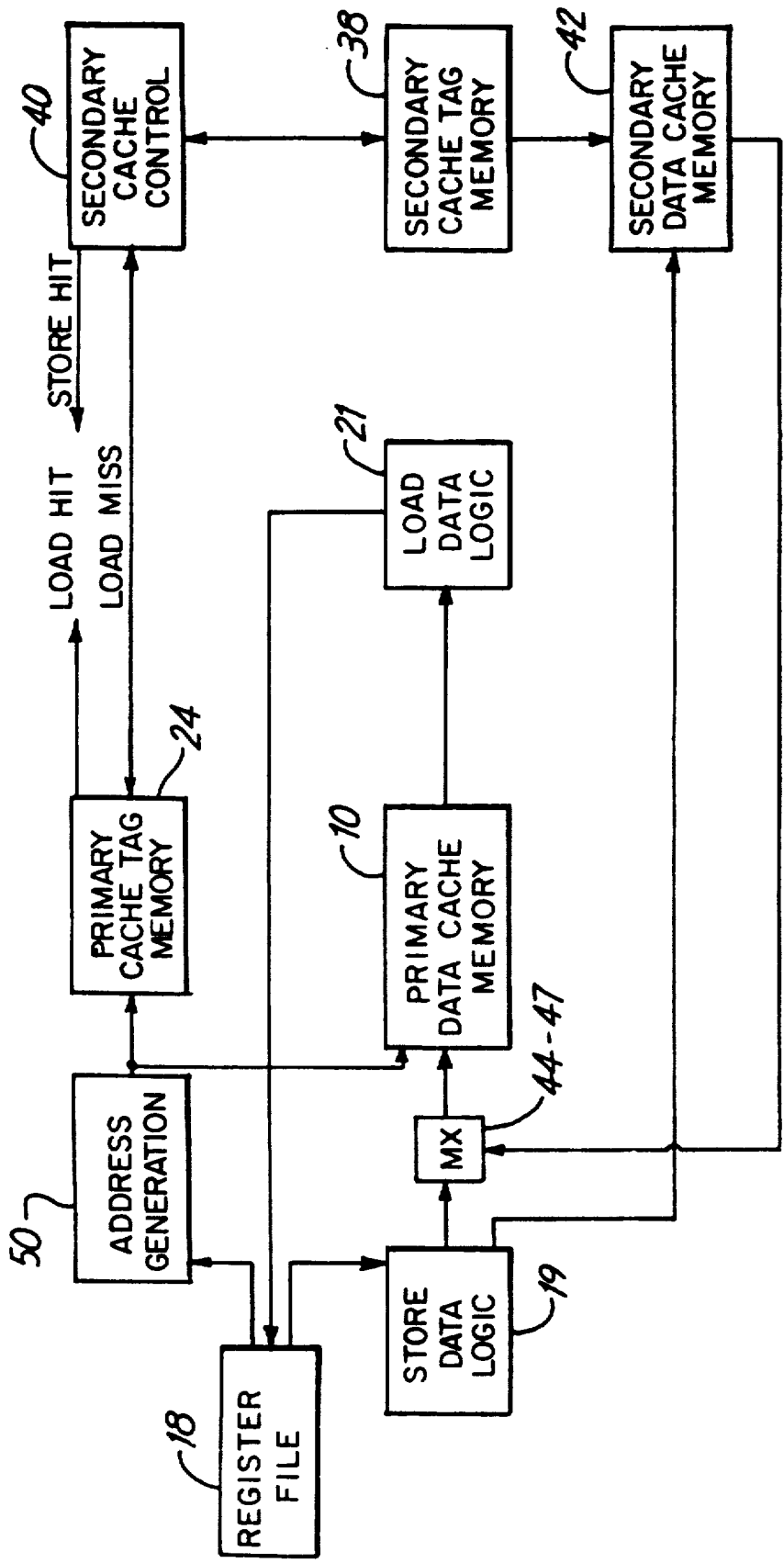

FIG. 2 is a functional logic diagram illustrating the operation of the data cache of the present invention. Table III sets forth the functions which are used for handling load instructions and for the first and second pass of store instructions in connection with the primary cache.

TABLE III

| | PRIMARY DATA CACHE LOGIC | | |
|---|---|---|---|
| | | STORE INST | |
| BLOCK | LOAD INST | 1st (allocate) | 2nd (commit) |
| Address Generation | Yes | Yes | Yes |
| Primary Cache Tag | Yes | Yes | No |
| Store Data Logic | No | No | Yes |
| Primary Data Memory | Yes | No | Yes |
| Load Data Logic | Yes | No | No |

As shown in Table III there are at least three functions that are used on all loads and stores: Address generation, primary cache tag memory, and primary cache data memory. The address and tag functions may be replicated, or may be pipelined at double clock frequency to provide double bandwidth. The primary cache data memory is structured as described above to permit multiple accesses per clock period. The store data logic and load data logic are only used for the respective instructions and have no conflicts with each other.

As shown in FIG. 2, in the load mode, address generation (illustrated at block 50) is commenced by the initial address being stored in register file 18 (FIG. 1) which may be incremented or added by load address adder 20 (FIG. 1) to increment or jump addresses. If the data to be loaded is in the primary data cache memory 10, primary tag memory 24 will indicate a hit and a load hit indication will be issued. (More particularly, a load miss signal will not be issued.) Thereupon the data is retrieved from primary data cache memory 10 and forwarded to the load data logic 21 to load data to register file 18.

If the load data is not present in the primary data cache 10 (and assuming no store conflict condition exists, as described above), a load miss signal is issued by control 16 (FIG. 1) to initiate a search in the secondary cache tag 38 under the control of secondary cache control 40. If the secondary cache tag indicates presence of the data in the secondary data cache memory, the data is loaded from secondary data cache memory 42 through one of multiplexers 44-47 to the primary data cache memory at the address specified by the load address previously generated (block 50). Secondary cache control 40 also updates the primary cache tag memory 24 so that the primary cache tag will indicate presence of the data in the primary data cache memory 10 during later requests. During the next or a later clock cycle, the primary cache tag memory 24 will indicate the presence of the data in the primary data cache memory and the data will be loaded to file register 18 as described above.

If the data for a load or store instruction is not in either the primary or the secondary data cache memory, a miss notification is returned and a request is made to main memory 60 (FIG. 1) to load the data into the primary and secondary data caches. As shown in FIG. 1, the request to main memory 60 is initiated by the primary cache control 16 in the case of a load miss and by the secondary cache control 40 in the case of a store miss. The data from main memory is forwarded through data multiplexers 44-47, and the addresses from main memory 60 are forwarded through address multiplexers 28-31. The data is also stored in the secondary cache memory 42.

IV. Single Pipe Secondary Cache with Dual Pipe Primary Cache

TABLE IV

| | SECONDARY DATA CACHE LOGIC | | |
|---|---|---|---|
| | | STORE INST | |
| BLOCK | LOAD INST | 1st (allocate) | 2nd (commit) |
| Second. Control Block | on primary miss | yes | yes |
| Secondary Tag Memory | on primary miss | yes | yes |
| Secondary Data Memory | on primary miss | no | yes |

Table IV illustrates the use of the secondary cache blocks during the load instruction and first and second passes of the store instruction. Load instructions use the secondary cache only on loads that are misses in the primary cache. Normally, a load hit rate of greater than 90% can be expected in the primary cache. Therefore, the load instruction impact on the secondary cache is less than 10%. First and second pass store instructions pass through the secondary cache. Since in this implementation load and store pairs can be issued during one cycle, the single bandwidth in the secondary cache is effectively utilized without significantly creating a bottleneck. To resolve potential conflicts between loads and stores in the secondary cache, it is preferred that the order of priority be in accordance with the following algorithm:

1. Second pass store operations (highest priority).
2. Loads with misses in primary cache.
3. First pass store operations (lowest priority).

Conclusion

From the foregoing, it is evident that the present invention provides a cache memory organization for effectively issuing store and load instructions with an out-of-order issue strategy. Instructions are issued in a double arrangement, thereby doubling the throughput of the data cache.

Although the present invention has been described with reference to the preferred embodiment, those skilled in the art will recognize that changes may be made in form and detail without departing from the spirit and scope of the invention.

What is claimed is:

1. Cache memory apparatus for storing and loading data in a pipeline computer comprising, in combination:
   first memory means having a plurality of locations;
   clock means providing sequential clock cycles;
   instruction issue means for issuing an instruction stream containing store instructions for controlling storage of data in said first memory means and load instructions for controlling retrieval of data from said first memory means;
   first cache control means connected to said instruction issue means and to said first memory means, said first cache control means being responsive to a load instruction issued by the instruction issue means to execute the load instruction at a load address in said first memory means, the load address representing a location in said first memory means from where data are to be retrieved under control of the corresponding load instruction, said first cache control means further being responsive to a store instruction issued by the instruction issue means and to a first clock cycle issued by said clock means to allocate a store cycle issued by said clock means to allocate a store address, the store address representing a location in said first memory means where data are to be stored under control of the corresponding store instruction; and
   store history table means connected to said first cache control means and responsive to the allocation of a store address by said first cache control means to store a record of the store instruction issued by said instruction issue means, said record including the store address allocated by the first cache control means;
said first cache control means being responsive to said store history table means and to a second clock cycle subsequent to the first clock cycle to commit the store instruction at the corresponding allocated store address in said first memory means and said store history table means being responsive to the first cache control means committing a store instruction to clear the record of the committed store instruction.

2. Apparatus according to claim 1 wherein said first cache control means is responsive said instruction issue means and to said store history table means for setting a store conflict condition in response to a load instruction from said instruction issue means for a store address in a record stored in said store history table means, said instruction issue means being responsive to a store conflict condition and to said clock means to reissue the load instruction which caused the store conflict condition during a subsequent clock cycle.

3. Apparatus according to claim 2 wherein the instruction stream issued by said instruction issue means includes plural branches of instructions, the apparatus further including branch test means for determining whether a branch of instruction is a correct branch or a branch error, said first cache control being further responsive to a determination of a branch error condition by the branch test means to clear store instruction records from said store history table means.

4. Apparatus according to claim 2 wherein said store history table means is responsive to said first cache control means to assign a unique store identification number to each record of a store instruction stored in said store history table means, said store history table means being responsive to the first cache control means to sequentially circulate through the store identification numbers as said first cache control means allocates store addresses, said store history table means being operable to invalidate all store instruction records upon rollover from the highest store identification number to the lowest store identification number.

5. Apparatus according to claim 2 wherein said store history table means is responsive to the allocation of a store address by said first cache control means to clear records of store instructions prior in the instruction stream to the store instruction corresponding to the allocated store address.

6. Apparatus according to claim 2 wherein said first cache control means includes tag means for storing a record of the addresses of data stored in said first memory means, said first cache control means setting a load miss condition in response to a load address from said instruction issue means for an address not stored in said tag means; second memory means; and second cache control means connected to said first cache control means and to said second memory means and responsive to said load miss condition to load data from said second memory means.

7. Apparatus according to claim 6 wherein said first cache means is further responsive to said store history table means to set said load miss condition is no store conflict condition exists.

8. Apparatus according to claim 1 further including first pipeline means connected between said instruction issue means and said first cache control means for transmitting store instructions to said first cache control means and second pipeline means connected between said instruction issue means and said first cache control means for transmitting load instructions to said first cache control means.

9. Apparatus according to claim 1 wherein said instruction issue means operates in accordance with the algorithm comprising:
   (a) a load instruction corresponding to a given address may be issued in any order in the instruction stream as long as there are no store instructions ahead of the load instruction in the instruction stream having a record in said store history table corresponding to the same given address, and
   (b) store instructions may be issued in any order.

10. Apparatus according to claim 1 wherein the instruction stream issued by said instruction issue means includes plural branches of instructions, the apparatus further including branch test means for determining whether a branch of instructions is a correct branch or a branch error, said first cache control being further responsive to a determination of a branch error condition by the branch test means to clear store instruction records from said store history table means.

11. Apparatus according to claim 10 wherein said store history table means is responsive to said first cache control means to assign a unique store identification number to each record of a store history table means being responsive to the first cache control means to sequentially circulate through the store identification numbers as said first cache control means allocates store addresses, said store history table means being operable to invalidate all store instruction records upon rollover from the highest store identification number to the lowest store identification number.

12. Apparatus according to claim 1 wherein said store history table means is responsive to said first cache control means to assign a unique store identification number to each record of a store instruction stored in said store history table means, said store history table means being responsive to the first cache control means to sequentially circulate through the store identification numbers as said first cache control means, allocates store addresses, said store history table means being operable to invalidate all store instruction records upon rollover from the highest store identification number to the lowest store identification number.

13. Apparatus according to claim 1 wherein said first cache control means includes tag means for storing a record of the addresses of data stored in said first memory means, said first cache control means setting a load miss condition in response to a load address in a load instruction from said instruction issue means for an address not stored in said tag means; second memory means; and second cache control means connected to said first cache control means and to said second memory means and responsive to said load miss condition to load data from said second memory means.

14. Apparatus according to claim 13 wherein said first cache control means is further responsive to said store history table means and to said load address to set said load miss condition if said load address is not an address in a record stored in said store history table means.

15. Apparatus according to claim 1 wherein said store history table means is responsive to the allocation of a store addresses by said first cache control means to clear records of store instructions prior in the instruction stream to the store instruction corresponding to the allocated store address.

16. Cache memory apparatus for storing and loading data in a pipeline computer comprising, in combination:
   first memory means having a plurality of locations;
   clock means providing sequential clock cycles;
   instruction issue means for issuing an instruction stream containing store instructions to control storage of data in said first memory means and load instructions to control retrieval of data from said first memory means;
   first cache control means connected to said instruction issue means and to said first memory means, said first cache control means being responsive to a load instruction issued by the instruction issue means to execute the load instruction at a load address in said first memory means, the load address representing a location in said first memory means from where data are to be retrieved under control of the corresponding load instruction; and
   store history table means connected to said first cache control means and responsive to a store instruction issued by the instruction issue means and to said clock means to execute a store allocate pass during a first clock cycle and a separate store commit pass during a second clock cycle subsequent to the first clock cycle, said store history table storing a record of the store instruction during a store allocate pass, said record including a store address representing a location in said first memory means where data are to be stored under control of the corresponding store instruction;
   said first cache control means being responsive to a store instruction issued by said instruction issue means to operate said store history table means to execute said store allocate pass whereby the store address corresponding to the store instruction is reserved, said first cache control further being responsive to a store commit pass to execute the store instruction at the store address in said first memory means, said store history table means being responsive to the first cache control means executing a store instruction to clear the record of the executed store instruction.

17. Apparatus according to claim 16 wherein said first cache control means is responsive to said instruction issue means and to said store history table means for setting a store conflict condition in response to a load instruction from said instruction issue means for a store address in a record in said store history table means, said instruction issue means being responsive to a store conflict condition and to said clock means to reissue the load instruction which caused the store conflict condition during a subsequent clock cycle.

18. Apparatus according to claim 16 wherein said first cache control means includes tag means for storing a record of the addresses of data stored in said first memory means, said first cache control means setting a load miss condition in response to a load address from said instruction issue means for an address not stored in said tag means; second memory means; and second cache control means connected to said first cache control means and to said second memory means and responsive to said load miss condition to load data from the load address in said second memory means causing the load miss signal.

19. Apparatus according to claim 18 wherein said first cache means is further responsive to said store history table means and to said load address to set said load miss condition if said load address is not an address in a record stored in said store history table means.

20. Apparatus according to claim 18 wherein said second cache control means is connected to said first cache control means, and said second cache control means operates said second memory means in an order of priority that
   (a) store instructions to be executed during store commit passes are accorded highest priority,
   (b) load instructions that caused miss conditions in the first memory means are accorded a lower priority than store commit passes, and
   (c) store addresses to be reserved during store allocate passes are accorded a lower priority than load instruction.

21. Apparatus according to claim 16 further including first pipeline means connected between said instruction issue means and said first cache control means for transmitting store instructions to said first cache control means and second pipeline means connected between said instruction issue means and said first cache control means for transmitting load instructions to said first cache control means.

22. Apparatus according to claim 16 wherein said instruction issue means operates in accordance with the algorithm comprising:
(a) a load instruction corresponding to a given address may be issued in any order in the instruction stream as long as there are no store instructions ahead of the load instruction in the instruction stream having a record in said store history table corresponding to the same given address, and
(b) store instructions may be issued in any order.

23. Apparatus according to claim 16 wherein the instruction stream issued by said instruction issue means includes plural branches of instructions, the apparatus further including branch test means for determining whether a branch of instructions is a correct branch or a branch error, said first cache control being further responsive to a determination of a branch error condition by the branch test means to clear store instruction records from said store history table means.

24. Apparatus according to claim 16 wherein said first cache control means is responsive to store instructions issued by the instruction issue means and to store allocation passes to allocate store addresses, said store history table means is responsive to said first cache control means to assign a unique store identification number to each record of a store instruction stored in said store history table means, said store history table means being responsive to the first cache control means to sequentially circulate through the store identification numbers as said first cache control means allocates store addresses, said store history table means being operable to invalidate all store instruction records upon rollover from the highest store identification number to the lowest store identification number.

25. Instruction issue apparatus for conditionally issuing instructions to a cache memory of a pipeline computer comprising, in combination:
instruction issue means for issuing an instruction stream containing a plurality of branches of store and load instructions;
cache control means connected to said instruction issue means and to said cache memory for allocating store addresses representing locations in said cache memory where data are to be stored and load addresses representing locations in said cache memory from where data are to be retrieved, said cache control means further including branch test means for determining whether a branch of instructions is a correct branch or a branch error; and
store history table means connected to said cache control means and to said instruction issue means and responsive to a store instruction from the instruction issue means to store a record of the store instruction issued by said instruction issue means, said record including the store address of said cache memory where data are to be stored under control of the corresponding store instruction;
said store history table means being further responsive to said branch test means determining a branch error condition to clear store instruction records from said store history table means.

26. Apparatus according to claim 25 wherein said store history table means is responsive to said cache control means to assign a unique store identification number to each record of a store instruction stored in said store history table means, said store history table means being responsive to the cache control means to sequentially circulate through the store identification numbers as said cache control means allocates store addresses, said store history table means being operable to invalidate all store instruction records upon rollover from the highest store identification number to the lowest store identification number.

* * * * *

UNITED STATES PATENT AND TRADEMARK OFFICE
CERTIFICATE OF CORRECTION

PATENT NO. : 5,261,071

DATED : November 9, 1993

INVENTOR(S) : TERRY L. LYON

Page 1 of 2

It is certified that error appears in the above-identified patent and that said Letters Patent is hereby corrected as shown below:

On the title page: Item[54] and Col. 1, line 1, DUAL PIPE CACHE MEMORY WITH OUT-OF-ORDER ISSUE CAPABILITY", insert --CACHE MEMORY WITH OUT-OF-ORDER ISSUE AND STORE INSTRUCTION HISTORY TABLE

On the Title Page of the Patent, in the References Cited Section, under U.S. PATENT DOCUMENTS, insert the following:

| | | | |
|---|---|---|---|
| 4,208,716 | 6/1980 | Porter et al | 364/200 |
| 4,245,304 | 1/1981 | Porter et al | 364/200 |
| 4,345,309 | 8/1982 | Arulpragasam et al | 364/200 |
| 4,349,871 | 9/1982 | Lary | 364/200 |
| 4,392,200 | 7/1983 | Arulpragasam et al | 364/200 |
| 4,503,497 | 3/1985 | Krygowski et al | 364/200 |
| 4,594,655 | 6/1986 | Hao et al | 364/200 |
| 4,811,215 | 3/1989 | Smith | 364/200 |

Col. 1, in between the Title of the Patent and the Heading entitled "BACKGROUND OF THE INVENTION" insert the following:

<u>RELATED APPLICATIONS</u>

Application Serial Number 07/704,830 filed May 23, 1991 for "Twist Cache Memory" by C.R. Cramm et al.

UNITED STATES PATENT AND TRADEMARK OFFICE
CERTIFICATE OF CORRECTION

PATENT NO. : 5,261,071

DATED : November 9, 1993

INVENTOR(S) : TERRY L. LYON

It is certified that error appears in the above-identified patent and that said Letters Patent is hereby corrected as shown below:

Col. 2, line 57, after "resides", insert --in--

Col. 3, line 6, delete "Figure", insert --Figure 1--

Col. 4, line 31, after "shown", insert --,--

Col. 3, lines 20-21, delete "instruction", insert --instructions--

Col. 3, line 22, after "adder", insert --20--

Col. 4, line 67, delete "load instruction", insert --load instruction 1--

Col. 6, line 60, after "entries", delete "which numbers.", insert --which are associated with that cycle of identification numbers.--

Col. 9, line 66, after "responsive", insert --to--

Col. 10, line 47, delete "is", insert --if--

Signed and Sealed this

Third Day of May, 1994

*Attest:*

BRUCE LEHMAN

*Attesting Officer*    *Commissioner of Patents and Trademarks*